(12) United States Patent
Mielke

(10) Patent No.: US 7,318,884 B2
(45) Date of Patent: Jan. 15, 2008

(54) APPARATUS FOR ELECTROCHEMICAL PRECISION MACHINING

(75) Inventor: Rainer Mielke, Oberursel (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 579 days.

(21) Appl. No.: 10/996,600

(22) Filed: Nov. 26, 2004

(65) Prior Publication Data

US 2005/0109634 A1    May 26, 2005

(30) Foreign Application Priority Data

Nov. 25, 2003   (DE) ................................ 103 55 875

(51) Int. Cl.
*C25D 17/00* (2006.01)
(52) U.S. Cl. .................... 204/224 M; 204/285; 269/55
(58) Field of Classification Search ........... 204/224 M, 204/280, 285, 286.1; 269/55
See application file for complete search history.

(56) References Cited

U.S. PATENT DOCUMENTS

| | | | |
|---|---|---|---|
| 3,072,777 A | 1/1963 | McKechnie | |
| 3,619,544 A | 11/1971 | Ullmann et al. | |
| 4,430,544 A | 2/1984 | Inoue | |

FOREIGN PATENT DOCUMENTS

| | | |
|---|---|---|
| DE | 1565393 | 2/1970 |
| DE | 2355675 | 5/1974 |
| EP | 1097774 | 5/2001 |

OTHER PUBLICATIONS

German Search Report dated Aug. 16, 2004.

*Primary Examiner*—Nam Nguyen
*Assistant Examiner*—Luan V. Van
(74) *Attorney, Agent, or Firm*—Timothy J. Klima

(57) ABSTRACT

On an apparatus for electrochemical precision machining, the tool holder (1) performing the oscillatory motion is supported by bearing bushes (25, 26) made of a swelling material within a casing (2) performing the feed motion. The swelling, cooling and lubricating liquid is supplied from liquid chambers (4, 5) provided in the casing. A further liquid chamber (6) prevents electrolyte from ingressing into the bearing bushes. The linear oscillatory motion of the tool holder is generated by a rocker (33) which is arranged vertically to the tool holder, extends through the casing and is driven by the eccentric (30) of a drive motor (29) with an associated frequency converter. A measuring device (42) and a fastener (43) enable the tool holder to be locked in a defined position, this permitting the apparatus to be operated with high accuracy also in the non-oscillating mode of the electrode.

20 Claims, 1 Drawing Sheet

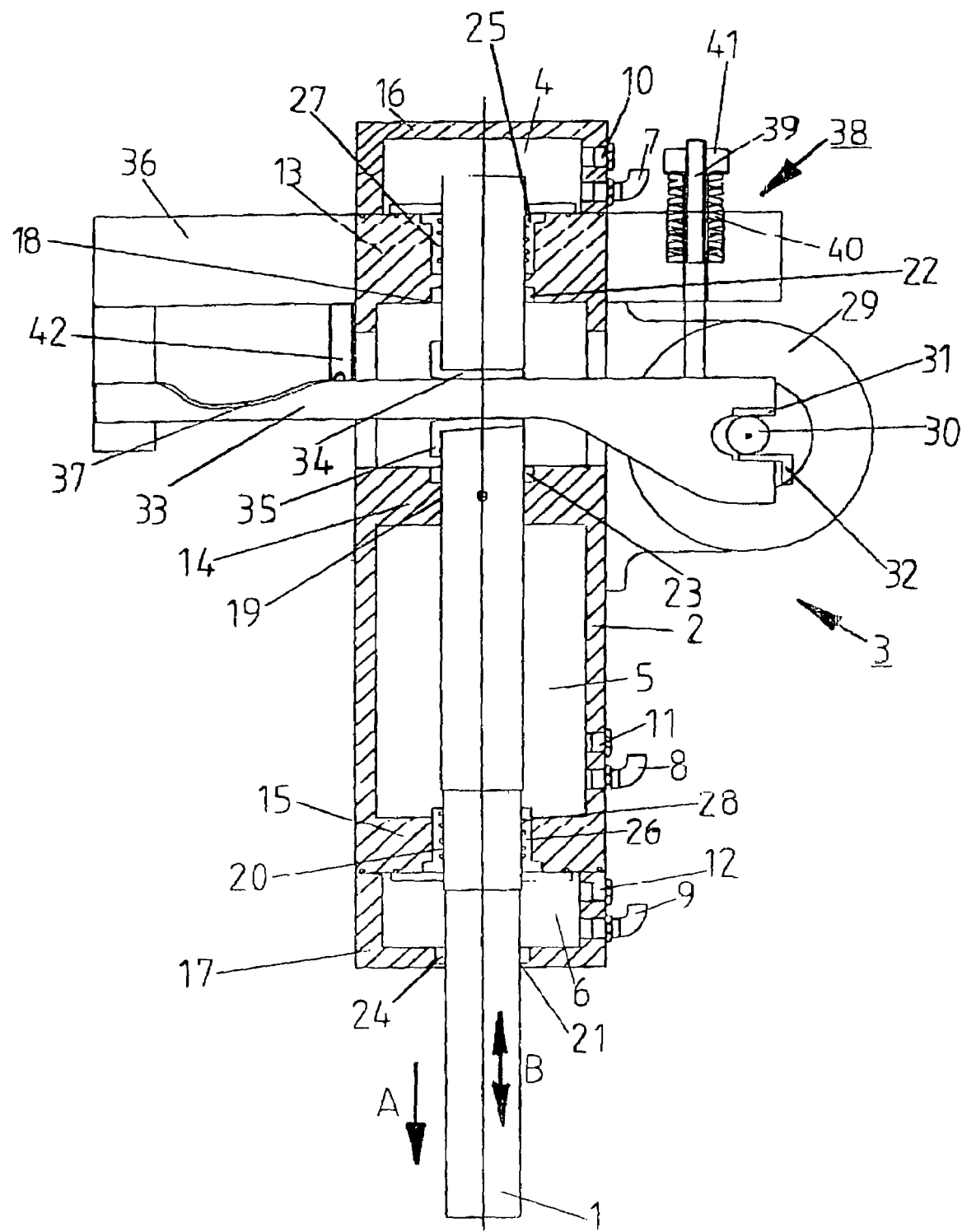

APPARATUS FOR ELECTROCHEMICAL PRECISION MACHINING

This application claims priority to German Patent Application DE10355875.6 filed Nov. 25, 2003, the entirety of which is incorporated by reference herein.

BACKGROUND OF THE INVENTION

This invention relates to an apparatus for electrochemical precision machining of metallic workpieces which comprises a tool holder for an electrode, an oscillating drive mechanism connected to the tool holder to generate an oscillatory motion of the electrode in the machining direction and a continuously linearly moving feed unit in which the tool holder is arranged and moveably supported in guiding means.

In electrochemical material removal, which is based on the principle of the electrochemical cell, an electrolytic solution flows through the small gap between the workpiece to be machined (anode) and the electrode (cathode) supported by the tool holder. While hydrogen ions are discharged at the cathode, metal ions react with OH ions of the water at the anode under the formation of metal hydroxide compounds settling as sludge. As the tool holder gradually moves in feed motion, metal is removed in an electrochemical process. If the electrode performs both, an oscillatory motion and a feed motion, with a voltage pulse being generated at the time of minimum distance, the precision of the machining process can be enhanced even more, accepting, however, a reduced removal rate. Electrochemical precision machining with oscillating electrode entails, however, the problem that an absolutely linear oscillation of the electrode, i.e. one without or with minimum lateral play, is to be ensured.

In an apparatus for electrochemical precision machining of metals known from Specification EP 1097774 A1, linear oscillation of the electrode is effected by an eccentric drive in which a connecting rod connects the crankshaft of an electric motor to the tool holder. The tool holder is supported, at the top and at the bottom, by means of two diaphragms in a feed unit (quill) performing the feed motion. This type of support enables the tool holder to perform a linear oscillatory motion in the quill. Due to a lateral motion component of the connecting rod tip, it is, however, not possible to guide the tool holder without any lateral play, despite the support in diaphragms. The accuracy of 0.05 mm obtainable with this type of support in the horizontal plane is insufficient for many applications, for example, the manufacture of blisk blades for aircraft turbines. Also, the accuracy of 0.03 mm obtainable in a machining direction does not satisfy the requirements for precision machining. Furthermore, the apparatus described in Specification EP 1097774 A1 is disadvantageous in that, due to the play in the connection of the connecting rod to the crankshaft, it can be set up and operated only in vertical position. In addition, this apparatus is not capable of providing the accuracy required for machining operations to be performed with less precision, but higher metal removal rate, since the position of the connecting rod or the electrode, respectively, cannot be determined or set and, further, the electrode is not lockable. The known apparatuses for electrochemical material removal are further problematic with regard to the sealing of the oscillating mechanism against the aggressive electrolyte.

BRIEF SUMMARY OF THE INVENTION

This invention, in a broad aspect, provides an apparatus for electrochemical metal machining of the type specified above which, while ensuring high precision, can be operated with minimum play in both lateral and machining directions, as well as in different positions.

It is in particular object of the present invention to provide solution to the above problems by an apparatus for electrochemical machining designed in accordance with the features described herein. Further features and advantageous embodiments of the present invention become apparent from the present description.

According to a first feature of the present invention, the long tool holder is arranged in a casing forming several chambers, with the casing being passed, and sealed on the side of the electrolyte, by the tool holder. As guiding means for the linear oscillatory motion, cooled and lubricated plain bearings made of a swelling material are arranged in the casing, these being supplied with the swelling, cooling and lubricating liquid from a liquid chamber allocated to each of these plain bearings. The linear oscillatory motion of the electrode connected to the tool holder is effected by a rocker arranged vertically to the longitudinal axis of the tool holder and extending through the casing, with this rocker mating with the tool holder, being firmly clamped at one end and being connected to an eccentric drive at the other end outside of the casing.

Thus, both the lateral play of the electrode and the play of the electrode resulting from the drive and transmission means in the machining direction can be significantly reduced compared with the known solutions, this providing for a substantial improvement in machining accuracy. The apparatus can be operated not only vertically, but also in any other position.

According to a further feature of the present invention, the electrode can be precisely set to its upper dead center position, and, thus, to the play-free upper dead center position of the drive unit, by means of a measuring device and a frequency converter allocated to the oscillating drive, and locked in this position by means of a locking device acting upon the tool holder. This enables this apparatus equally to be operated with high accuracy in the more effective, while less precise mode with non-pulsating electrode.

According to a further feature of the present invention, a further liquid chamber is provided in the lower portion of the casing facing the electrolyte where the tool holder passes through the bottom wall of the casing. This liquid chamber is provided with a sensor, preferably a conductivity measuring sensor, to enable any penetration of electrolyte into the casing resulting from a defective seal at the passage of the tool holder to the electrolyte to be immediately detected.

In a development of the present invention, the liquid chambers are enclosed in the casing by partitions provided with sealed passages for the tool holder. The plain bearings are bearing bushes in hygroscopic, swelling material arranged in the passages and being spirally grooved on their inner circumference for a flow of liquid from the liquid chambers.

In a further development of the present invention, a brace is provided at the casing remotely of the rocker, this brace holding, at one end, the firmly clamped side of the rocker and, on the other end, being elastically connected to the rocker for mass compensation. Arranged between the rocker and the brace is the—preferably piezoelectric—measuring device for the precise determination of the position of the rocker and, thus, of the electrode.

The rocker, which features a resilient zone near its clamping end, interacts with the tool holder via crowned bearing plates.

In a further development of the present invention, the drive motor is actuated via a frequency converter for the control of the oscillating frequency and for synchronization of the apparatus with other oscillation exciters. In particular, this enables the apparatus to be operated outside the resonant frequency of the workpieces to be machined.

BRIEF DESCRIPTION OF THE DRAWINGS

An embodiment of the present invention is more fully described in the light of the accompanying drawing, with the only FIGURE showing a partial view of an apparatus for electrochemical metal machining with a tool holder and the associated driving and guiding means providing the linearly oscillating motion of the tool holder.

DETAILED DESCRIPTION OF THE INVENTION

The summary of the invention above is incorporated by reference herein. The core of the electrochemical material removal apparatus is, as shown on the drawing, the tool holder 1 which is capable of performing an oscillatory motion in the machining direction, as indicated by arrowhead B (feed motion as indicated by arrowhead A), and which carries, at its free end (bottom end on the drawing), the electrode for machining the respective workpiece (electrode and workpiece not shown). The tool holder 1 is moveably supported in a casing 2. Arranged on the casing 2 is a drive mechanism 3 which interacts with the tool holder 1 to generate the linear oscillatory motion of the tool holder 1. In addition, the casing 2, together with the tool holder 1 and the drive mechanism 3, is movable in the machining direction (arrowhead A) by means of a further driving arrangement (not shown).

The casing 2 is divided into three (first to third) liquid chambers 4, 5 and 6 containing distilled water which are filled via the inlet ports 7, 8 and 9. To check the liquid level in the liquid chambers 4 and 5, sensors or sight glasses 10 and 11 are provided in the casing wall, while a conductivity measuring sensor 12 is provided in the liquid chamber 6 situated at the bottom in the machining direction. The liquid chambers 4, 5 and 6 are separated from each other and to the outside by first to third partitions 13, 14 and 15 as well as a top wall 16 and a bottom wall 17, respectively. The partitions 13 to 15 and the bottom wall 17 have sealed first to fourth passages 18, 19, 20 and 21. Sealing in the first, second and fourth passage 18, 19 and 21 is effected by means of seals 22, 23 and 24. Bearing bushes 25 and 26 are arranged in the first and third passage 18 and 20 of the first and third partition 13 and 15, these bearing bushes consisting of hygroscopic material and having a spiral groove 27, 28 on the inner circumferential surface.

The design of the casing 2 with liquid chambers 4 to 6 and with bearing bushes 25, 26 made of hygroscopic material provides for the following: The tool holder 1 is supported in the bearing bushes 25, 26 and, as it oscillates, is cooled and lubricated by the water entering the spiral grooves 27, 28 from the first liquid chamber 4 or the second liquid chamber 5, respectively. A prime function of the water is to swell the plastic material (e.g. PTFE) of the bearing bushes 25, 26, thus minimizing the lateral play of the tool holder 1. The machining accuracy, or the max. deviation, in the horizontal direction is $\frac{1}{100}$ mm and less for this type of support of the tool holder.

The third liquid chamber 6, which is also filled with water, serves for the sealing of the bearing bushes 25, 26 and the oscillating drive mechanism 3 against the electrolyte in that any electrolyte possibly ingressing via the fourth passage 21 in the bottom wall 17 is thinned and, further, such ingress of electrolyte into the third liquid chamber 6 is immediately indicated by the conductivity measuring sensor 12. Avoiding the ingress of electrolyte is crucial since, for example, in the electrochemical machining of turbine blades made of titanium, the electrolyte consists of a NaCl solution and the hydrochloric acid produced during the metal machining process could damage the plastic bearing bushes 25, 26.

As already mentioned, play in the drive motor and the power transmission elements for the generation of the oscillatory motion of the tool holder also affects the machining accuracy in the machining direction. In order to reduce this play and improve the machining accuracy in the longitudinal direction, the oscillating drive mechanism 3 comprises a drive motor 29 flanged to the outer wall of the casing 2 and provided with an eccentric 30 at which a rocker 33, which is arranged vertically to the direction of motion of the tool holder 1, is located play-free by means of a first bearing plate 31 and a wedge-shaped second bearing plate 32. The rocker 33 extends through the casing 2 via openings in the longitudinal walls of the casing 2 between the first and the second partition 13, 14. At the faces which oppose each other in the machining direction, the rocker 33 interacts without play with the tool holder 1, actually in the center of the rocker 33 via a crowned third bearing plate 34 and a crowned and wedge-shaped fourth bearing plate 35. The free end of the rocker 33 is firmly connected to a brace 36 attached parallelly to and remotely of the rocker 33 at the casing 2. The rocker 33, at its clamped end at the brace, features a resilient sector 37 which is optimized for stress and vibration by weakening the material in curved form to compensate the bending stresses applied to the rocker 33. In addition, the resilient sector 37 is shot-peened to impart residual compressive stresses into the surface for increasing service life. Since the bearing plates 34, 35 are crowned towards the side faces of the rocker 33, any bending in the rocker 33 will not be transmitted to the tool holder 1, as a result of which any lateral deflection of the tool holder 1 will be avoided. The measures described above enable the play in the machining direction (longitudinal direction of the tool holder 1) caused by the drive motor 29 to be reduced to a value of less than $\frac{1}{100}$ mm, thus providing for high machining accuracy.

An adjustable mass compensation unit 38, consisting of a tie rod 39 connected to the rocker 33, a pressure spring 40 and a setting nut 41, is arranged on the brace 36. It enables large electrode weights to be partly compensated to reduce wear in moving parts. Furthermore, a double-eccentric (not shown) to increase to twice the oscillation frequency can be used, as the mass compensation unit 38 is also capable of compensating the play of such a double-eccentric.

The apparatus also features a piezoelectric measuring device 42 arranged between the brace 36 and the rocker 33 which enables the position of rest of the rocker 33 and, thus, of the tool holder and the electrode to be determined. By actuation of the drive motor 29 through a frequency converter (not shown), the rocker 33—and thus the electrode—can be set to a defined position using the measuring device 42. The possibility to precisely determine the position of the electrode by means of the measuring device 42 and to lock this position enable the electrochemical machining process to be performed also in the non-oscillating mode which, while being less precise, is more effective. In this case, the tool holder 1 is locked to the casing 2 by means of a fastener, for example a fixing bolt. In the non-oscillating mode, the tool holder 1 will preferably be locked in the upper dead center position as it corresponds to the play-free upper dead center position of the eccentric 30. Furthermore, an important function of the frequency converter is the ability to control the oscillation frequency of the electrode and to operate the system synchronously with other vibration exciters as well as with a defined frequency which lies outside the resonant frequency of vibration-sensitive workpieces to be machined, for example blisks.

LIST OF REFERENCE NUMERALS

1 Tool holder
2 Casing
3 Oscillating drive mechanism
4 First liquid chamber
5 Second liquid chamber
6 Third liquid chamber
7 First inlet port
8 Second inlet port
9 Third inlet port
10 Sight glass/sensor
11 Sight glass/sensor
12 Conductivity measuring sensor
13 First partition
14 Second partition
15 Third partition
16 Top wall
17 Bottom wall
18 First passage
19 Second passage
20 Third passage
21 Fourth passage
22 Seal
23 Seal
24 Seal
25 Bearing bush
26 Bearing bush
27 Spiral groove
28 Spiral groove
29 Drive motor
30 Eccentric
31 First bearing plate
32 Second (wedge-shaped) bearing plate
33 Rocker
34 Third (crowned) bearing plate
35 Fourth (crowned, wedge-shaped) bearing plate
36 Brace
37 Resilient sector of 33
38 Mass compensation unit
39 Tie rod
40 Pressure spring
41 Setting nut
42 Piezoelectric measuring device

What is claimed is:

1. An apparatus for electrochemical precision machining of metallic workpieces, comprising,
a casing,
a tool holder for an electrode,
an oscillating drive mechanism connected to the tool holder to generate an oscillatory motion of the electrode in the machining direction, and
a continuously linearly moving feed unit having guiding means for positioning and movably supporting the tool holder, the guiding means including a plurality of cooled and lubricated bearing bushes made of a swelling material and situated in the casing to create liquid chambers in the casing, the oscillating drive mechanism comprising a rocker, arranged vertically to a longitudinal axis of the tool holder and extending through the casing, an upper and lower surface of the rocker, as related to the longitudinal axis of the tool holder, bilaterally mating with the tool holder, with one end of the rocker being firmly clamped with respect to the casing, while an opposite end is driven in an oscillatory motion outside the casing.

2. An apparatus in accordance with claim 1, wherein the tool holder has an elongated shape and is supported in at least first and second bearing bushes acting as plain bearings and arranged remotely of each other, the first and second bearing bushes being made of hygroscopic plastic material, with the rocker mating with the tool holder between the bearing bushes.

3. An apparatus in accordance with claim 2, wherein each of the bearing bushes includes a spiral groove on an inner circumferential surface, which is flown by a fluid acting as a cooling, lubricating and swelling liquid.

4. An apparatus in accordance with claim 3, wherein the cooling, lubricating and swelling liquid is distilled water.

5. An apparatus in accordance with claim 1, wherein the casing includes a top wall, a bottom wall, and first, second and third partitions, with the partitions and the bottom wall including passages for the tool holder that are fitted with seals, and with a first liquid chamber being positioned between the top wall and the first partition provided with the first bearing bush, and with a second liquid chamber being positioned between the second partition and the third partition provided with the second bearing bush, and with the rocker extending through the casing via openings in a longitudinal wall of the casing between the first and the second partition.

6. An apparatus in accordance with claim 5, wherein the liquid chambers include inlet ports and at least one of sight glasses and level sensors.

7. An apparatus in accordance with claim 1, comprising a brace attached to the casing remotely of and essentially parallel to the rocker, this brace holding, on one side, the firmly clamped end of the rocker and, on an other side, being connected to the drive-side end of the rocker via an adjustable, spring-retained tie rod acting as a mass compensation element.

8. An apparatus in accordance with claim 1, comprising a drive motor attached to the casing for driving the rocker, and an eccentric attached to the drive motor to be rotationally driven by the drive motor, the rocker including, on its drive side, a first bearing plate and a wedge-shaped second bearing plate that flank a portion of the eccentric to convert rotary motion of the eccentric to oscillating linear motion of the drive side of the rocker.

9. An apparatus in accordance with claim 8, wherein the drive motor is actuatable via a frequency converter to control the oscillation frequency of the electrode and to set a specific position of the electrode for the operation of the apparatus with a non-oscillating electrode.

10. An apparatus in accordance with claim 9, comprising a measuring device for determining a position of the electrode connected to the tool holder.

11. An apparatus in accordance with claim 10, wherein the measuring device is a piezoelectric device and is positioned between the brace and the rocker.

12. An apparatus in accordance with claim 9, wherein, in the non-oscillating mode, the tool holder is positioned in an upper dead center position corresponding to an upper dead center position of the eccentric, and is locked in this position by a fastener.

13. An apparatus in accordance with claim 1, wherein the rocker mates with the tool holder between a third bearing plate and a wedge-shaped fourth bearing plate, with these bearing plates being crowned respectively towards the upper and the lower surface of the rocker.

14. An apparatus in accordance with claim 1, wherein the rocker includes a resilient section in the form of a curved material recession near its clamped end.

15. An apparatus in accordance with claim 5, wherein a third liquid chamber is provided in the casing between the third partition and the bottom wall through which the tool holder protrudes into the electrolyte required for electrochemical machining, this third liquid chamber being provided with an inlet port for filling with fluid and a conductivity measuring sensor to detect any ingress of electrolyte into the casing.

16. An apparatus in accordance with claim 2, wherein the casing includes a top wall, a bottom wall, and first, second and third partitions, with the partitions and the bottom wall including passages for the tool holder that are fitted with seals, and with a first liquid chamber being positioned between the top wall and the first partition provided with the first bearing bush, and with a second liquid chamber being positioned between the second partition and the third partition provided with the second bearing bush, and with the rocker extending through the casing via openings in a longitudinal wall of the casing between the first and the second partition.

17. An apparatus in accordance with claim 16, comprising a drive motor attached to the casing for driving the rocker, and an eccentric attached to the drive motor to be rotationally driven by the drive motor, the rocker including, on its drive side, a first bearing plate and a wedge-shaped second bearing plate that flank a portion of the eccentric to convert rotary motion of the eccentric to oscillating linear motion of the drive side of the rocker.

18. An apparatus in accordance with claim 17, comprising a brace attached to the casing remotely of and essentially parallel to the rocker, this brace holding, on one side, the firmly clamped end of the rocker and, on an other side, being connected to the drive-side end of the rocker via an adjustable, spring-retained tie rod acting as a mass compensation element.

19. An apparatus in accordance with claim 18, wherein the rocker mates with the tool holder between a third bearing plate and a wedge-shaped fourth bearing plate, with these bearing plates being crowned respectively towards the upper and the lower surface of the rocker.

20. An apparatus in accordance with claim 19, wherein the rocker includes a resilient section in the form of a curved material recession near its clamped end.

* * * * *